United States Patent Office 2,861,077
Patented Nov. 18, 1958

2,861,077
PREPARATION OF NICOTINIC ACID ESTERS

Robert S. Aries, New York, N. Y.

No Drawing. Application October 7, 1955
Serial No. 539,273

8 Claims. (Cl. 260—295.5)

The present invention relates to the manufacture of esters of pyridine monocarboxylic acids from pyridine dicarboxylic acids and more particularly to the preparation of esters of nicotinic acid with relatively volatile alcohols directly from isocinchomeronic or cinchomeronic acid.

In the oxidation of methyl ethyl pyridine with nitric acid a mixture of nicotinic acid and isocinchomeronic acid is formed. Upon cooling the reaction product slowly, the isocinchomeronic acid precipitates out and can be recovered by filtration while the nicotinic acid can be treated in any desired manner. To obtain the full benefit of the initial methyl ethyl pyridine, the isocinchomeronic acid has heretofore been treated for conversion to nicotinic acid such as by heating in a liquid medium, e. g., water, sulfuric acid, cyclohexanone, heat transfer oil, or the like.

Quinolinic acid (cinchomeronic acid) is obtained by oxidation of quinoline with manganese dioxide, and as with isocinchomeronic acid, heretofore was generally decarboxylated in a separate treatment to form nicotinic acid for use in further syntheses of nicotinic acid derivatives.

In either process the nicotinic acid obtained by decarboxylation was generally separated from unreacted material and from the small amount of degration products which necessarily form. As a result the full utilization of all heterocyclics required additional equipment and considerable time to convert the dicarboxylic acid formed into the desired monocarboxylic acid material.

The additional expense of making full use of the heterocyclic values upon occasion has resulted in the pyridine dicarboxylic acids being discarded since the selling price hardly exceeded the cost of the further processing.

Moreover, even when the isocinchomeronic acid has been converted to nicotinic acid in a separate step, it was then necessary to separately treat the niacin for the preparation of further derivatives suitable for use as intermediates in the preparation of pharmaceuticals and the like. In the preparation of niacinamide (nicotinic acid amide), for example, an ester of nicotinic acid is first prepared and then reacted with ammonia to form the amide. Consequently, to convert the pyridine dicarboxylic acid to an ester of nicotinic acid necessitated a series of syntheses which rendered the process less economical.

In accordance with the present invention, it has now been found that pyridine dicarboxylic acids can be directly converted to esters of pyridine monocarboxylic acids in a single step. In the event that there is employed a crude dicarboxylic acid which still contains monocarboxylic acid, the pyridine monocarboxylic acid will also be esterified so that a greater yield of ester will be obtained than might have been expected from the dicarboxylic acid content itself. As a result, it is possible to employ as the starting material for the present invention the dicarboxylic acid as obtained from oxidation of methyl ethyl pyridine or quinoline, either with or without removal of all or part of the nicotinic acid contained therein.

The reaction is effected by refluxing the mass containing the pyridine dicarboxylic acid together with an alcohol at elevated temperature. The reaction temperature should be at least 125° C. and preferably at least 150° C. In the event that the boiling point of the alcohol is too low or if it is desired to accelerate the reaction by elevating the temperature beyond the boiling point of the particular alcohol involved, pressure may be applied. To avoid decomposition of the nitrogen heterocyclic acids, it is generally advisable to maintain the reaction temperature below 250° C. and consequently vacuum may also be employed with alcohols of higher boiling point. Preferably, however, the reaction is conducted below 250° C. with primary or secondary alcohols which boil below 250° C.

While alcohols containing any additional functional groups not reactive with the pyridine carboxylic acids, such as ether groups, may be employed, since the alcohol radical is often subsequently removed as in making niacinamide it is preferable to employ the least costly alcohols suitable for the desired results. Consequently, the alkanols and especially those containing from 4 to 8 carbon atoms are preferred. However, the water-miscible lower alkanols such as methanol, ethanol, propanol and isopropanol may also be employed if pressure equipment is available.

The ratio of alcohol to acid to be esterified can be varied as desired, but an excess of alcohol should be present to react with all the acid. When a portion of the alcohol is removed from the reaction vessel, as through azeotropic distillation, either the alcohol should be decanted and returned, or alternatively, a large excess of alcohol can be employed initially, or alcohol may be added as removed by distillation.

Following the esterification, the unreacted alcohol is first distilled off and the nicotinic acid ester will subsequently be distilled.

The following examples illustrate procedures whereby nicotinic acid esters may be prepared directly from masses containing pyridine dicarboxylic acids:

*Example 1*

One mole (167 grams) of cinchomeronic acid and 400 grams of normal hexanol were refluxed in a one liter stainless steel vessel equipped with agitation, a reflux condenser and a water trap. The trap was connected to the reflux condenser so that the condensate flowed into the trap and the overflow from the trap flowed back to the agitated vessel. The water was heavier and therefore settled to the bottom of the trap. Accordingly, water was removed from the reaction mass as soon as it formed. While refluxing the above mixture over a period of 30 hours, water and carbon dioxide were formed. The water was collected in the trap and the carbon dioxide escaped through the reflux condenser.

The reaction mixture was distilled through a column under vacuum (5 to 10 mm.) until the oil bath temperature used for heating the distillation flask rose to 225° C. The first fraction which weighed 280 grams consisted of recovered n-hexanol; an intermediate fraction weighed 22 grams; and the final fraction which was n-hexyl nicotinate weighed 158 grams. The still residue weighed 44 grams.

*Example 2*

The reaction vessel described in Example 1 was charged with 167 grams of isocinchomeronic acid and 400 grams n-octanol and refluxed for 24 hours. A yield of 185 grams of n-octyl nicotinate was isolated by distillation.

*Example 3*

The reaction vessel described in Example 1 was charged with 167 grams isocinchomeronic acid and 600 grams n-butyl alcohol. The mixture was refluxed for several hours but the esterification was very slow. The reflux condenser was removed and 25 p. s. i. of nitrogen was applied. While under pressure the temperature of the reaction mixture was raised to 180–190° C. for 5 hours. The pressure rose to 200 to 250 p. s. i. After cooling to 100° C. the pressure was released. The reaction mixture was discharged and 300 g. of distillate were removed by distillation. It consisted of n-butanol and water. The residue remaining in the flask was returned to the reaction vessel with an additional 300 grams of n-butanol and reacted for an adidtional 5 hours at 180–190° C. under pressure. By distillation of the reaction mixture, 133 grams of butyl nicotinate was obtained.

*Example 4*

A mixture of 167 grams isocinchomeronic acid and 600 grams of secondary butyl alcohol was reacted at 180 to 190° C. under pressure as described in Example 3. A yield of 138 grams of secondary butyl nicotinate was obtained.

*Example 5*

The pressure vessel used in Example 3 was charged with 167 grams cinchomeronic acid and 600 grams dry ethanol. Pressure (25 p. s. i.) was applied with nitrogen and the mixture was heated to 160–180° C. for 8 hours. Alcohol and water were removed by distillation until the temperature in the residue of the fluids rose to 130° C. The residue was added to the pressure vessel with 600 grams dry ethanol and heated for 8 hours more at 160–180° C. A yield of 132 grams of ethyl nicotinate was obtained by distillation. Unreacted nicotinic acid was recovered from the distillation residue.

Various changes and modifications may be made without departing from the spirit and scope of the present invention and it is intended that such obvious changes and modifications be embraced by the annexed claims.

What is claimed is:

1. The process for preparing a pyridine monocarboxylic acid ester which comprises refluxing a mass consisting essentially of a pyridine dicarboxylic acid and an alkanol at a temperature ranging from about 125° C. to about 250° C.

2. The process for preparing a nicotinic acid ester which comprises refluxing a mass consisting essentially of a cinchomeronic acid and an alkanol containing up to about eight carbon atoms at a temperature ranging from about 150° C. to about 250° C.

3. The process for preparing a nicotinic acid ester which comprises refluxing at a temperature ranging from about 150° C. to about 250° C. a mass consisting essentially of a cinchomeronic acid and an alkanol forming an azeotrope with water.

4. The process of claim 3, wherein said alkanol is n-hexanol.

5. The process of claim 3, wherein said alkanol is n-octyl alcohol.

6. The process of claim 3, wherein said alkanol is n-butanol.

7. The process of claim 3, wherein said alkanol is secondary butyl alcohol.

8. The process for perparing a lower alkyl nicotinate which comprises heating a mixture consisting essentially of a lower alkanol and a cinchomeronic acid under sufficient pressure to maintain the mass at a boiling point ranging between about 150° C. to about 250° C., withdrawing vapors of said alkanol and of water formed in the course of the reaction, and distilling the residue to obtain the lower alkyl nicotinate.

References Cited in the file of this patent

UNITED STATES PATENTS

| | | |
|---|---|---|
| 2,389,065 | Lee et al. | Nov. 13, 1945 |
| 2,702,802 | Aries | Feb. 22, 1955 |
| 2,836,601 | Wilbert | May 27, 1958 |

FOREIGN PATENTS

| | | |
|---|---|---|
| 1,067,397 | France | June 15, 1954 |